(12) United States Patent
Mahmood et al.

(10) Patent No.: US 12,225,425 B2
(45) Date of Patent: Feb. 11, 2025

(54) METHOD AND SYSTEM FOR CRITERION-BASED LOCALIZATION OF MOBILE DEVICES

(71) Applicants: Ahmed Mahmood, Milton (CA); Sean Huberman, Guelph (CA); Xuyang Han, Waterloo (CA); Eros Gulo, Woodbridge (CA)

(72) Inventors: Ahmed Mahmood, Milton (CA); Sean Huberman, Guelph (CA); Xuyang Han, Waterloo (CA); Eros Gulo, Woodbridge (CA)

(73) Assignee: Mapsted Corp., Oakville (CA)

( * ) Notice: Subject to any disclaimer, the term of this patent is extended or adjusted under 35 U.S.C. 154(b) by 372 days.

(21) Appl. No.: 17/727,027

(22) Filed: Apr. 22, 2022

(65) Prior Publication Data

US 2023/0345199 A1    Oct. 26, 2023

(51) Int. Cl.
*H04W 4/021*      (2018.01)
*H04W 4/029*      (2018.01)

(52) U.S. Cl.
CPC ........... *H04W 4/021* (2013.01); *H04W 4/029* (2018.02)

(58) Field of Classification Search
CPC ...... G01S 13/931; G01S 17/89; G01S 17/931; G01S 11/06; G01S 5/0027; G01S 5/02526; G01S 5/16; G01S 5/015; G01S 5/01; G01S 5/021; H04W 4/029; H04W 4/38; H04W 4/33; H04W 4/021; H04W 64/00; H04W 4/02; H04W 64/006; H04W 4/027; H04W 4/024; H04W 64/003; G01C 21/206; G01C 21/165; G01C 21/1652; G01C 25/005; G01C 25/00
See application file for complete search history.

(56) References Cited

U.S. PATENT DOCUMENTS

| | | | |
|---|---|---|---|
| 2013/0162481 A1* | 6/2013 | Parvizi | G01S 5/02524 |
| | | | 342/452 |
| 2017/0265041 A1* | 9/2017 | Mahasenan | H04W 64/00 |
| 2020/0008024 A1* | 1/2020 | Hu | H04W 4/38 |
| 2021/0105443 A1* | 4/2021 | Fridental | G08B 13/19608 |
| 2022/0011116 A1* | 1/2022 | Panzer | G05D 1/0274 |

* cited by examiner

*Primary Examiner* — Olumide Ajibade Akonai

(57) ABSTRACT

A method and a device for criterion-based calibration for localization of mobile devices are described. In an example, sensorial data for a zone in the indoor space is obtained. The zone can have a set of factors influencing a behavior of the sensorial data therein. A component of instantaneous localization in the zone is determined based on the sensorial data by simulating variation of the component. The estimation is evaluated based on a ground truth value of the component and, on the basis thereof, a localization criterion is associated with the zone. The localization criterion is indicative of a selectivity in use of the sensorial data for localizing the mobile device in the zone.

18 Claims, 3 Drawing Sheets

300

OBTAINING SENSORIAL DATA FOR A ZONE IN THE INDOOR SPACE, THE ZONE BEING ASSOCIATED WITH A SET OF FACTORS INFLUENCING A BEHAVIOR OF THE SENSORIAL DATA IN THE ZONE
310

ESTIMATING AT LEAST ONE COMPONENT OF INSTANTANEOUS LOCALIZATION IN THE ZONE BASED ON THE SENSORIAL DATA, WHEREIN THE ESTIMATING COMPRISES SIMULATING VARIATION OF THE AT LEAST ONE COMPONENT
320

EVALUATING THE ESTIMATION OF THE AT LEAST ONE COMPONENT BASED ON A GROUND TRUTH VALUE OF THE AT LEAST ONE COMPONENT
330

ASSOCIATING A LOCALIZATION CRITERION WITH THE ZONE, WHEREIN THE LOCALIZATION CRITERION IS INDICATIVE OF A SELECTIVITY IN USE OF THE SENSORIAL DATA FOR LOCALIZING THE MOBILE DEVICE IN THE ZONE
340

FIG. 3

METHOD AND SYSTEM FOR CRITERION-BASED LOCALIZATION OF MOBILE DEVICES

TECHNICAL FIELD

The disclosure herein relates to the field of mobile device indoor navigation and localization.

BACKGROUND

Users of mobile devices increasingly use and depend upon indoor positioning and navigation applications and features. Particularly, indoor positioning and navigation of a mobile device carried or worn by a user can be difficult to achieve using satellite-based navigation systems because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other mobile computing devices, in conjunction with acquired wireless communication signal data to localize the mobile device. Thus, effectiveness of the indoor navigation and positioning solution is directly dependent on the quality of data, sensor or signal, and the manner of utilization of data for localization.

BRIEF DESCRIPTION OF THE DRAWINGS

FIG. 3 illustrates, as an example, a method of calibration for criterion-based localization of mobile devices.

DETAILED DESCRIPTION

Figure 1:
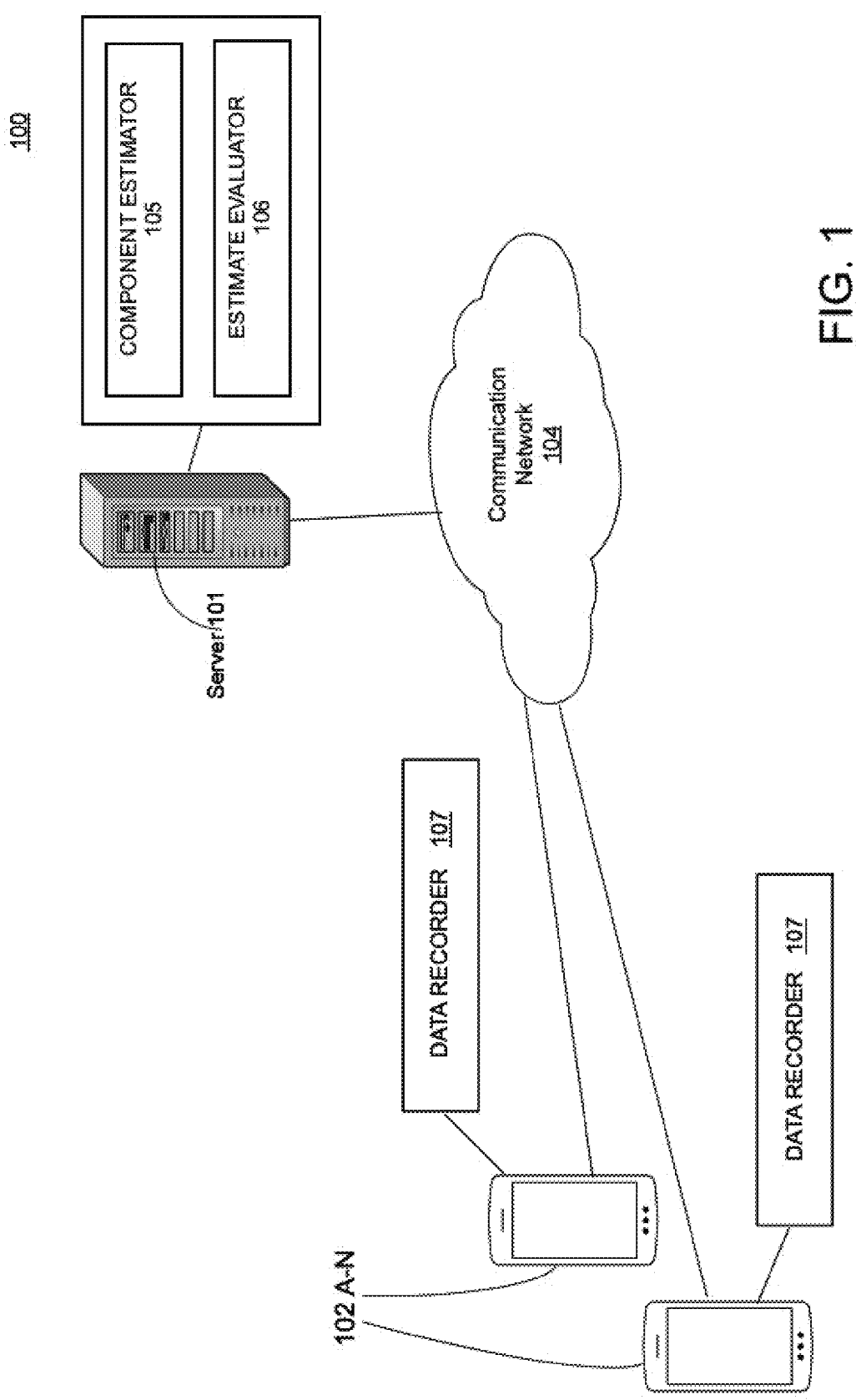
FIG. 1 illustrates, as an example, a network environment for calibration for criterion-based localization of mobile devices in an indoor space.

Generally, sensorial data, such as that from inertial sensors and/or signal sensors, may be used for location estimation in an indoor space. Usually, for localization of a mobile device in the indoor space, combination of the sensorial data is used in conjunction with various positioning techniques. For example, a trajectory of the mobile device can be estimated using the positioning techniques, which may use the sensorial data. In such location estimation or positioning techniques, the data sensors may not always provide an accurate and reliable mode of estimation, mostly owing to the fact that the behavior of each type of sensor may vary in the indoor space depending on various factors, including environmental factors associated with the indoor space. In other words, owing to the nature of the sensor or the manner in which the sensorial data is generated, not all types of sensors may behave in a similar manner at all locations in the indoor space. For example, given the nature of magnetic field signals, magnetic field sensors may not be useful in locations where there are a number of other magnetic fields which can influence the magnetic field signals from the magnetic field sensors. In another example, received signal strength as data for use for localization may not be useful in certain locations owing to its attenuation characteristics.

The problem is further convoluted when the indoor spaces vary such that each type of indoor space is characteristically different from the other. For example, an office indoor space has a fundamentally different structure and layout than a parking lot. Even within a certain family of indoor spaces or venues, such as shopping malls, the indoor environment may vary greatly and the indoor space may contain areas of unique environmental characteristics. For example, the indoor space, such as the shopping mall, may be made of long narrow hallways or pathways as well wide-open spaces, and may also include locations which have different elevations of the same location at different floors. Such common spatial features can impact the positioning performance by affecting the behavior of the sensorial data. For example, in narrow corridors, the presence of walls can reduce the spread in variation of motion data and, hence, the noise variance in determining orientation can be small. Alternatively, in wide corridors or open spaces, the noise variance can be large, which can cause substantial spread in variation of motion data. For instance, wireless signals can propagate freely in large open spaces, while indoor spaces having walls, furniture, obstacles, and user traffic may lead to poor signal propagation. Accordingly, wireless signal in the indoor space behave depending on the environment type and corresponding access point density, for instance, number of access points per floor.

In another example, wiring and magnetic conductors in walls or pillars in the indoor space can impact the behavior of the sensorial data, for instance, behavior of the magnetic field sensor data, in the indoor space. In terms of reliability, for instance, in certain cases, the magnetic sensor data may be more reliable in narrow corridors whereas, in certain other scenarios, it may be found to be more reliable in wide corridors. Therefore, the degree to which reliance can be placed on magnetic sensor data for localization in the indoor space may differs across the same venue.

In yet another example, reliability of Global Positioning System (GPS) signal can be significantly influenced by the structure and layout of the indoor space. For instance, usually for indoor venues, such as spaces with underground tunnels, such as underground public transport stations, or large buildings with many floors and underground floors, the GPS signal is not reliable or not even available. However, for some venues, for example, indoor spaces with large windows and/or skylights, GPS can be reliable and can provide relatively accurate corresponding sensor data readings.

Therefore, any given indoor space can influence the behavior of the sensorial data both in terms of, both, in terms of spatial features which may, for instance, influence inertial sensor data, as well as the environment that influences the signal sensor data. However, there is no set pattern in which the behavior is affected in the indoor spaces and, is in fact, a complex combination of various factors. For this reason, at least, conventional positioning techniques may be unable to accurately localize the mobile device. Further, the inaccurate localization may still involve consumption of substantial computational resources and time, given the enormous amount of sensorial data from all the various sensors, inertial as well as signal, internal to the mobile device as well as external. Therefore, such expenditure of processing resources and time may occur to still arrive at an inadequate and futile exercise of localization of the mobile device. In other words, notwithstanding the lack of accuracy, the positioning techniques, may suffer from high latency as well as high computational cost.

Examples of the present subject matter are described herein which seek to address, inter alia, the above outlined deficiencies. Among other benefits and technical effects, embodiments provided herein provide for efficiently and accurately calibrating as well as determining positions of mobile devices in an indoor space by performing localization. In an example, the indoor space can be a shopping mall, an airport, a warehouse, a campus building, an office space, a stadium, a hospital, a parking lot, or any other at least partially enclosed building. The calibration is achieved by, first, determining behavioral patterns of sensorial data in one or more zones in the indoor space and, then, evaluating different types of sensorial data to determine which ones to use as the basis to localize the mobile device in those zones in the indoor space. In an example, the sensorial data can include data from inertial sensors as well as data from signal sensors.

The present subject matter, basically, is based on the fact that, localization or positioning of a device or user in an indoor space is made up of multiple components and each such component is influenced by a different and, usually, peculiar combination of sensorial data in a particular location or zone inside the indoor space. The components of localization can include, for example, a trajectory of the mobile device, a variation in speed along the trajectory, a variation in elevation along the trajectory, an allowable threshold variation in the at least one component, or any combination thereof. In other words, accurately localizing a user in the indoor space is a function of the accuracy with which the components of localization are determined in the indoor space, and the accuracy of determining the components of localization is, in turn, fairly dependent on the behavior of the sensorial data inside the indoor space. The behavior of the sensorial data can be affected by various factors including a size of the zone, a shape of the zone, a type of the zone, a number of users passing through the zone, predicted movement patterns of the mobile device in the zone, or any combination thereof. Once the reliable combination of sensorial data is identified for a given zone of the indoor space, that combination of sensorial data may be primarily considered, as part of the calibration, as the localization criterion for localizing the mobile device when the mobile device is determined to be in that zone. Accordingly, the localization of the mobile device with a criterion-based localization technique can reap accurate position estimation as well as efficient use of the resources, in term of computational resources as well as time.

Therefore, according to an aspect, the present subject matter discloses that optimal indoor localization, for example, accurate as well as computationally light, is achieved when positioning techniques are curated to the match the characteristics of the location of the indoor space in which the localization is to be performed. In other words, the reliability or trustworthiness of sensorial data for localization in the indoor space or a given zone of the indoor space may vary depending upon a complex amalgamation of factors. The present subject matter envisages a selectivity in use of the sensorial data to enable a reliable feedback for localization of the mobile device when used at a particular location, based on the influence that the location and its associated factors have on the behavior of the sensor and the sensorial data therefrom.

Embodiments herein provide a technique for criterion-based calibration of an indoor space and localization of a mobile device in that space. In particular, the technique may involve obtaining sensorial data for a zone, for example, collected from the zone, in the indoor space. As explained above, the zone is associated with various factors that influence the behavior of the sensorial data in the zone. Based on the sensorial data of the zone, at least one component of instantaneous localization in the zone is estimated, for instance, using localization techniques. As part of such estimation, the variation of the at least one component in the zone, owing to the behavior of the sensorial data is simulated. Further, the estimation, i.e., the results of estimation of the component of instantaneous localization are evaluated based on a ground truth value of that component. In addition, broadly speaking, based on the evaluation, the type of sensorial data that can be useful for localization in that zone can be selected. Accordingly, for the purposes of selecting the sensorial data which is to be used, a localization criterion can be employed and associated with the zone. In other words, the localization criterion is indicative of a selectivity in use of the sensorial data for localizing the mobile device in the zone. Once the calibration, as explained above has been completed, the localization is performed in the zone of the indoor space based on the localization criterion.

For instance, the localization criterion can be based on a per-trajectory basis or on a cumulative estimate of the localization of the mobile device. For example, the localization criterion may be a weightage to be associated with the sensorial data from each of the sensors for modularity in usage of the sensorial data while localizing the mobile device, and may be determined for each zone, based on predetermined behavior of sensorial data in each zone.

Also provided herein in a server computing device including a processor and a memory storing a set of computer instructions. The instructions are executable in the processor for performing criterion-based calibration of an indoor space and localization of a mobile device in that space using the criterion-based calibration as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components.

Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system 100 for calibration, for example, criterion-based calibration of an indoor space, using spatial/sensorial data, which calibration can be, subsequently used for localization inside that indoor space. The system includes a server 101, having a component estimator 105 and an estimate evaluator 106, and is communicatively connected via communication network 104 to a plurality of data recording devices 102A-N, referred to herein, collectively, as data recording devices 102 and, individually, as the data recording device 102. Each data recording device 102 includes a data recorder 107, which in one embodiment, may be included in a calibration software application downloaded and installed in each individual data recording device 102. According to an aspect, the system 100 is capable of collection of sensorial data from the data recording devices 102 in indoor areas for performing criterion-based calibration of the space.

As used herein, the term data recording devices 102 refers to any singular mobile device among data recording devices 102. In one embodiment, data recording devices 102 may correspond to, for example, a cellular communication device (e.g., smartphone, tablet, etc.) that is capable of telephony, messaging, and/or data computing services. In variations, data recording devices 102 can correspond to, for example, a tablet or a wearable computing device. According to an aspect, the data recording device 102 can be any portable device having a plurality of sensors including inertial sensors and signal sensors. For instance, inertial sensors may include accelerometer, gyroscope, barometer, and other sensors having magnetic field sensing functionality and/or environmental pressure sensing functionality. Similarly, in said example, the signal sensors may include sensors capable of detecting and measuring Bluetooth, Wi-Fi, RFID, and GPS signals.

In the examples discussed above as well as henceforth, the sensorial data or spatial data, as referred above, that is acquired by the data recording device 102 for the purposes of criterion-based calibration of the space in the indoor area can include, for instance, the wireless signal data generated by the data recording device 102. The wireless signal data including signal strength and connectivity, such as Wi-Fi received signal strength (RSS) and Bluetooth received signal strength (RSS) connectivity and measurements, inertial data, barometric data, magnetic data including field strength and direction data, and other device data that may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion.

In embodiments, the sensorial data, as recorded by the data recording devices 102 and then obtained or acquired by the server 101, in addition to above, may include respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors are different, the signal and sensor information as measured may be aggregated and fused, for example, time-averaged across particular periods of time, with the aggregated and fused value being used to represent the signal information at any given instance of time within that particular period of time in which the signal information is aggregated and fused.

In operation, the server 101 can obtain sensorial data gathered by one or more data recording devices 102 for a zone in the indoor area. The space may be a portion or whole of an indoor venue or area, such as a shopping mall, an airport, a warehouse, a stadium, a parking lot, a university, or any at least partially enclosed building. The zone can be considered to be one part of the indoor space or the entire indoor space, in one example, can be the zone. In other words, the indoor space can be divided into one or more zones and the data can be obtained for each zone and the criterion-based calibration be performed for each zone. In an example, the zone can be user-defined, for instance, in a floor plan of the indoor space.

The server 101 can use the sensorial data, so recorded, for first calibrating the indoor space or at least the zone thereof, and then positioning a device similar to the data recording device 102 in that space. The server 101 can achieve the calibration by, first, determining behavioral patterns of sensorial data in the zone in the indoor space and, then, evaluating different types of sensorial data to determine which ones to use as the basis to localize the mobile device in that zone in the indoor space. For instance, based on the evaluation, a peculiar combination of sensorial data may be determined as relevant for localization in a particular location or zone inside the indoor space. Once the reliable combination of sensorial data is identified for that location or zone of the indoor space, that combination of sensorial data may be at least considered, as part of the calibration, as the localization criterion for localizing the mobile device when the device is determined to be in that zone.

In operation, the server 101 can obtain sensorial data for a zone, for example, collected from the zone, in the indoor space. The zone may be associated with various factors that influence the behavior of the sensorial data in the zone and the factors can include, for instance, a size of the zone, a shape of the zone, a type of the zone, a number of users passing through the zone, predicted movement patterns of the mobile device in the zone, or any combination thereof. Based on the sensorial data of the zone, the server 101 can estimate one or more components of instantaneous localization in the zone, for instance, using localization techniques. The component of instantaneous localization can include, for example, a trajectory of the mobile device, a variation in speed along the trajectory, a variation in elevation along the trajectory, an allowable threshold variation in the at least one component, or any combination thereof. As part of the estimation of the components of instantaneous localization, the server 101 can simulate the variation of the component in the zone, owing to the behavior of the sensorial data. In an example, the server 101, as part of simulating the variation of the component, can find an estimate of the component under a predefined optimality criterion, while the estimate can also have a degree of ambiguity associated with it. For instance, the predefined optimality criterion in case of a trajectory can include comparing sensorial data along a route traversed by the mobile device with the fingerprint map under a probabilistic framework, and fusing the results of the comparison with information acquired for a floor plan.

Further, as part of the calibration, the server 101 can evaluate the estimation, i.e., the results of estimation of the component of instantaneous localization, based on a ground truth value of that component. In other words, the accurate localizing of a user in the zone is a function of the accuracy with which the server 101 can determine the components of instantaneous localization in the zone, and the accuracy of determining the components of localization is, in turn, fairly dependent on the behavior of the sensorial data inside the zone. Accordingly, in said example, the evaluation of the estimation can include determining an error in estimation of the component of instantaneous localization with respect to the ground truth value of the component. For instance, the ground truth value of the component can indicate a known true value of the component previously determined for the zone based on known, accurate techniques.

In another implementation, for instance, for making the processing of the sensorial data manageable, the server 101 can, breakdown, the entire set of sensorial data into smaller sets by classifying the sensorial data into a plurality of localization parameter sets. The classification or breaking down of the sensorial data can done based on a predetermined classification parameter which can be indicative of different localization parameters associated with the sensorial data. In other words, the localization parameters can be any parameter that can be used to logically categorize the sensorial data into smaller buckets or sets and are each known to differently and characteristically form the basis of variation of the sensorial data in the zone. For instance, the predetermined classification parameter or the localization parameter for categorizing the sensorial data can include a source of the sensorial data, for example, the signal sensors and inertial sensors, as well as a floor plan associated with the indoor space or the zone. Therefore, in the above example, the localization parameter sets may include Wi-Fi RSS parameter set, Bluetooth RSS parameter set, magnetic data parameter set, and the like. Additionally, in said implementation, as part of estimation explained above, the server 101 can individually determine components of instantaneous localization based on each localization parameter set. In other words, in the above example, the server 101 can separately determine the components making up the instantaneous localization based on the W-Fi RSS sensorial data, Bluetooth RSS data, magnetic data, and other sources of sensorial data. Further, the server 101 can also evaluate the estimation of the components, for each localization parameter set, based on the ground truth value of the components.

Subsequently, based on the evaluation, the server 101 can identify and select the type of sensorial data that can be useful for localization in that zone. Accordingly, for the purposes of selecting the sensorial data which is to be used, the server 101 can determine and then associate a localization criterion to be employed with the zone which can be indicative of a selectivity in use of the sensorial data for localizing the mobile device in the zone. Once the calibration, as explained above has been completed, the server 101 can perform localization in the zone of the indoor space based on the localization criterion. As an example, the localization criterion can be a selection of sensorial data along with a weightage to be associated with the sensorial data for selectivity in usage of the sensorial data while localizing the device in a given zone.

For instance, in continuation of the above example where the localization parameters can be different sources of the sensorial data, the sources which are known or found to having a greater degree of reliability can have their sensorial data associated with a higher weightage, depending on a reliability score associated with each of the sources in the given zone. In said example, the reliability score can be associated with each source for the given zone in the calibration phase and stored in the server 101. In the end, therefore, the sensorial data may be used as per the associated weightages for localization of the device.

Figure 2:
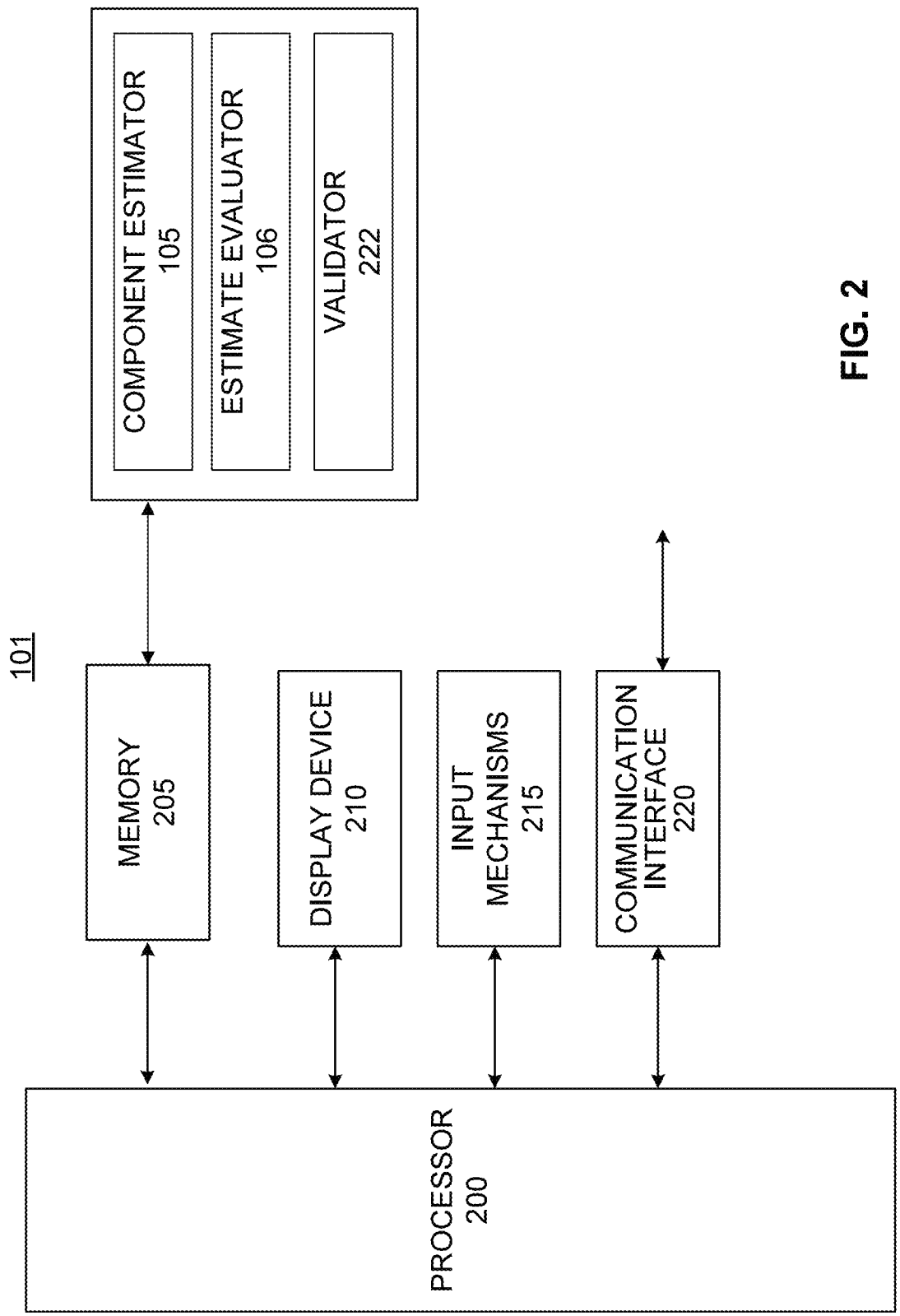
FIG. 2 illustrates, as an example, an architecture of a computer server for calibrating in case of criterion-based localization of mobile devices.

FIG. 2 illustrates an example architecture of the server computing device 101, referred to as the server 101, for the criterion-based calibration of the space in an indoor area. The server 101, in an embodiment architecture, may be implemented on one or more server devices, and includes processor 200, memory 205 which may include a read-only memory (ROM) as well as a random-access memory (RAM) or other dynamic storage device, display device 210, input mechanisms 215 and communication interface 220 for communicative coupling to communication network 104. Processor 200 is configured with software and/or other logic (such as from a trusted GPS logic module) to perform one or more processes, steps and other functions described with implementations, such as described by FIGS. 1 through 4 herein. Processor 200 may process information and instructions stored in memory 205, such as provided by a random-access memory (RAM) or other dynamic storage device, for storing information and instructions which are executable by processor 200. Memory 205 also may be used for storing temporary variables or other intermediate information during execution of instructions to be executed by processor 200. Memory 205 may also include the ROM or other static storage device for storing static information and instructions for processor 200; a storage device, such as a magnetic disk or optical disk, may be provided for storing information and instructions. Communication interface 220 enables server 101 to communicate with one or more communication networks 104 (e.g., cellular network) through use of the network link (wireless or wired). Using the network link, server 101 can communicate with data recording devices 102.

The server 101 may include instructions stored in RAM of memory 205, and includes the component estimator 105, the estimate evaluator 106, and a validator 222.

To begin with, the server 101 can obtain sensorial data associated with a zone in the indoor space for which the criterion-based calibration is to be performed. In an example, the server 101 can initiate the recording or gathering of the sensorial data by prompting one or more data recording devices 102, such as mobile phones. For instance, processor 200 uses executable instructions to further trigger executable instructions stored in the data recorder 107 of the data recording device 102 to acquire sensorial data within the zone, when the data recording device 102 is in the vicinity of the zone or in the zone. The zone may be an indoor space, such as a shopping mall, an airport, a warehouse, a university, or any at least partially enclosed building, or a part thereof.

In an example, the server 101 can trigger the data recording device 102 to begin gathering the sensorial data for the zone in the indoor space. As explained above, the zone is associated with various factors that influence the behavior of the sensorial data in the zone. Such factors can include including a size of the zone, a shape of the zone, a type of the zone, a number of users passing through the zone, predicted movement patterns of the mobile device in the zone, or any combination thereof. As an example, such factors can particularly influence the sensorial data from the different sources of sensorial data in different and unpredictable ways and the present subject matter seeks to allay the irregularities in localization which may occur due to such unpredictability in behavior of sensorial data.

In one example, the sensorial data include the data either from inertial sensors or signal sensors and can include wireless signal data, inertial data, barometric data, magnetic data and other device data may include such as, but not limited to, instantaneous inertial sensor measurements including directional heading and step length, short-term inertial sensor measurement history within a specified time window, Wi-Fi received signal strength and connectivity measurements, Bluetooth received signal strength measurements, barometric-based pressure data, magnetic field data including field strength and direction, cellular communication signal strengths, and GPS signal data.

Further, in said example, the server 101 can cooperate with, for instance, either a satellite-based navigation system, such as a global positioning system (GPS), or a cellular signal-based locating system or a combination thereof, of the data recording device 102 to determine the location of the data recording device 102 before it can trigger the commencement of data collection. For instance, when the server 101 discovers, based on inputs from the locating system, that the data recording device 102 is in the indoor area of a venue for which the calibration is to be done, then the server 101 can initiate the data recording device 102 to record sensorial data. In another case, the data collection can be a manual process in which a user carries the data recording device 102 in various parts of the indoor space to gather the sensorial data. Once gathered, the sensorial data can be acquired or obtained by the server 101 from the data recording device 102, for instance, over the network 104.

At the server 101, the sensorial data so obtained can be used for performing criterion-based calibration of the zone. Accordingly, based on the sensorial data of the zone, the component estimator 105 can estimate one or more components of instantaneous localization in the zone. The component of instantaneous localization can include, for example, a trajectory of the mobile device, a variation in speed along the trajectory, a variation in elevation along the trajectory, an allowable threshold variation in the at least one component, or any combination thereof. As part of the estimation of the components of instantaneous localization, the component estimator 105 can simulate the variation of the component in the zone, owing to the behavior of the sensorial data. In an example, the component estimator 105 may use a variety of techniques for estimating the one or more components of instantaneous localization. In one example, estimating the trajectory of the data recording device 102 in the zone, based on the sensorial data so gathered, may involve data fusion of the sensorial data.

In another implementation, for instance, for making the processing of the sensorial data manageable, the component estimator 105 can, breakdown, the entire set of sensorial data into smaller sets by classifying the sensorial data into localization parameter sets. A predetermined classification parameter can be used for breaking down the entire sensorial data. In an example, the predetermined classification parameter can be based on the different kinds of localization parameters, i.e., data that can be used for localization, associated with the sensorial data. Therefore, the classification criterion, i.e., the localization parameter, can include any feature of the sensorial data that can be used to logically categorize the sensorial data into smaller sets which are each known to differently and characteristically can be one basis that factors-in the variation in the sensorial data in the zone.

For instance, as one example, the predetermined classification parameter can be the type of zone in from which the sensorial data has been collected and can include a narrow passageway, a floor-transition zone having elevators or escalators, or open lobbies. In another example, the predetermined classification parameter or the localization parameter for categorizing the sensorial data can include a source of the sensorial data, for example, the signal sensors and inertial sensors, as well as a floor plan associated with the indoor space or the zone. Therefore, in the latter example, the localization parameter sets may include Wi-FI relative signal strength (RSS) parameter set, Bluetooth RSS parameter set, magnetic data parameter set, and the like.

Additionally, in said implementation, as part of estimation explained above, the component estimator 105 can individually determine components of instantaneous localization, as described above, for each localization parameter set. In other words, in the above example, the component estimator 105 can separately determine the components making up the instantaneous localization based on the W-Fi RSS sensorial data, Bluetooth RSS data, magnetic data, and other sources of sensorial data.

In addition, as another example of the present subject matter, the component estimator 105 can use automated templates for estimation of the component of instantaneous localization, for instance, for efficient management of the sensorial data in determining the component. For example, the automated templates may be based on historical values of the component for a given type, shape, or size of zone, and the automated template may be used for limiting the scope of assessment of the component in that given zone, for instance, in terms of the sensorial data to be considered usable for the estimation.

As an example, the range of the value of the component may be A-B for a shopping mall, whereas for an office space, the range of value of the same component may be C-D, i.e., completely different. Therefore, given the type, shape, size, or a combination of these, the component estimator 105 can employ the automated template for limiting the range of values of the component for the zone while performing the estimation. In a further example, the component estimator 105 can use a hybridized selection of ranges of values while estimating using the automated templates, such that certain portion of the values of the component outside the range may also be considered as valid while estimating. For example, the component estimator 105 can consider 70% of the estimated values within the expected range as valid, while 30% of estimated values outside the expected range are considered as valid for estimating the component in the given zone. Such a selection of range in employing the data points in the sensorial data can allow for, as mentioned above, an efficient manner of selecting the sensorial data that is usable as well as the extent of assessment required for estimating the component of instantaneous localization.

Further, as explained previously, the estimate evaluator 106 can evaluate the estimation, i.e., the results of estimation of the component of instantaneous localization, based on a ground truth value of that component, as part of the calibration. In the second implementation explained above, the estimate evaluator 106 can also evaluate the estimation of the components, for each localization parameter set, based on the ground truth value of that component.

As discussed previously, the accuracy with which the position of a mobile device can be determined in the zone is fairly dependent on the accuracy with which the estimate evaluator 106 can determine the components of instantaneous localization in the zone. Accordingly, in said example, the estimate evaluator 106 can evaluate the estimation by determining an error in estimation of the component of instantaneous localization with respect to the ground truth value of the component. In said example, the ground truth value of the component can be a known true value of the component previously determined for that zone using one or more techniques which have been established to be accurate. Additionally, as an example, a predetermined error threshold may be used for comparing and estimating the error in estimation of the component of instantaneous localization viz-a-viz the ground truth value. For instance, a threshold percentage match with the ground truth value can determine whether the estimation is erroneous or not.

The estimate evaluator 106 may use various evaluation techniques for estimating errors or insights on the estimation of the component by the component estimator 105 using the sensorial data. The evaluation techniques so employed by the estimate evaluator may depend on various factors including, for example, the predetermined classification parameter or the localization parameter based on which the sensorial data has been categorized, as explained above. In one example, if the source of the sensorial data is Wi-FI, i.e., the localization parameter is WI-FI RSS, or the source of the sensorial data is Bluetooth Low Energy (BLE) which means that the localization parameter is BLE RSS, then the evaluation techniques employed by the estimate evaluator may include the Kullback-Leibler divergence technique, the Root Mean Squared Error (RMSE) technique, the Average Error technique, or a weighted combination thereof. In another example, where the source of sensorial data is magnetic data, the estimate evaluator 106 may employ the Fréchet Distance technique, the Dynamic Time Warping technique, the Average Error technique, or a weighted combination thereof. In yet another example, if the localization parameter is a motion model parameter, then the technique employed by the estimate evaluator 106 may include the Average convergence time technique, the Quality of convergence technique, and the False positives/negatives technique.

Subsequently, based on the evaluation, the estimate evaluator 106 can identify and select the type of sensorial data that can be useful for localization in that zone. Accordingly, for the purposes of selecting the sensorial data which is to be used, the estimate evaluator 106 can determine and then associate a localization criterion to be employed with the zone which can be indicative of a selectivity in use of the sensorial data for localizing the mobile device in the zone. Once the calibration, as explained above has been completed, the estimate evaluator 106 can perform localization in the zone of the indoor space based on the localization criterion. As an example, the localization criterion can be a selection of sensorial data along with a weightage to be associated with the sensorial data for selectivity in usage of the sensorial data while localizing the device in a given zone.

In one example, the estimate evaluator 106 can, as part of associating the localization criterion with the type of sensorial data, can assign a weightage with each type of the sensorial data, based on a reliability score linked with each type of the sensorial data in estimating the component. For instance, in case where the localization parameters can be the different sources of the sensorial data, the sources which are known or found to having a greater degree of reliability can have their sensorial data associated with a higher weightage, depending on a reliability score associated with each of the sources in the given zone. In one example, the weightage associated with a certain sensorial data can be "1" which means that that sensorial data is to be used, whereas in another case, the weightage can be "0" meaning that that sensorial data is not to be used. In the present example, a high weight, for example, close to "1" may mean that the extent to which that sensorial data contributes in determining the location may be high, whereas a low weightage may mean that the extent to which that sensorial data influences the determination of the location may be low. In said example, the reliability score can be associated with each source for the given zone in the calibration phase and stored in the server 101. Accordingly, for selective utilization of the sensorial data, the server 101 can determine the localization criterion for each source of the sensorial data in the zone and can use the cumulative result of the aggregation of the sensorial data and their respective weightages or localization criterion for localizing the devices. In the end, therefore, the sensorial data may be fused as per the associated weightages and then utilized for localization of the device. For determining the position, the server 101 may fuse the device signal data, the device sensorial data, and other relevant data with the fingerprint localization data and utilize technique known in the art for performing the localization of the device. Although the examples above are provided with references to only the source of sensorial data as the characterization of its type, various other such characterizations are envisaged as part of the present subject matter.

In addition, in one example of the present subject matter, the validator 222 is to perform a qualitative validation of the sensorial data based on a set of qualitative modifiers. The validator 222 may performed the qualitative validation for simply validating the results of the estimate evaluator 106, i.e., to cross-verify the accuracy of estimation of the component, or in case none of the results do not meet a threshold accuracy level. For instance, the set of qualitative modifiers can include a density of visits in the zone which indicates a number of times each zone has been visited, say for calibration; a density of the sensorial data collected for the zone which indicates an amount of data actually collected per area of the zone; a density of sources of sensorial data in the zone which indicates a number of signal sources per area in the zone and, in general, the greater the number, the more accurate positioning is expected; a stability of the sources of the sensorial data in the zone which is a measure of the stability/reliability of signals per area in the zone; an average deviation in the sensorial data in the zone, a diversity in the sensorial data collected from the zone which indicates device diversity, i.e., the number and different types of devices that collect data per area in the zone, and indicates time diversity which is a measure of the average time separation between consecutive data collections in the zone; a frequency of collection of sensorial data from the zone; an average localization accuracy in the zone; or a combination of all such modifiers.

In addition, the server 101 can use the sensorial data and extract calibration information associated with a series of locations in the space. The fingerprint map generator 106 may use the extracted calibration information along with the structural map to generate the fingerprint map or the fingerprint repository of the space. For instance, the calibration information can include signature of the sensorial data per location in the space and which can be used to individually identify each location inside the space. In an example, the fingerprint map can indicate variation of sensorial data on the structural map, i.e., in the space, and can be usable for localization or positioning as well as navigation inside the space. In an example, the fingerprint map may be indicative of the discretized distribution of the calibrated spatial data in the space in an indoor area and can be used for localizing devices in the space in an indoor area. Therefore, as a consequence of the calibration by the server 101, in an example, the server 101 may include a fingerprint repository (not shown in figures), which may be communicatively accessible to mobile devices, via the network, for localization. For instance, once the space is calibrated, the various locations or physical entities identified in the space can be georeferenced with any information which can be used to indicate the location of the physical entity in the space. In one example, as part of georeferencing, global or absolute coordinates are used to indicate the location of the physical entities. In other examples, a local coordinate system, for instance, associated with the space in an indoor area, may be used for georeferencing the physical entities. Further, in addition to the fingerprint map being integrated with the georeferences of the various physical entities, the fingerprint map can also be integrated with a spatial indexing model of the space for use for localizing the mobile devices. Upon completion of this association, the fingerprint map in combination with the structural map can be used for localization and providing one or more indoor-location based services based on localization of a mobile device in the space in an indoor area.

In some embodiments, given that sampling times and sampling rates applied in conjunction with particular mobile device sensors may be different, the signal and sensor information as measured during a fingerprint calibration process may be aggregated and fused, for example, time-averaged across particular periods of time, with the aggregated and fused value being used to represent the signal information at any given instance of time within that particular period of time in which the signal information is aggregated and fused.

The terms fingerprint map, fingerprint data, and/or fingerprint repository as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. A sequence of positions or locations that constitute a navigation path traversed by the mobile device relative to a given indoor facility may be fingerprint-mapped during calibration, and the resulting fingerprint map stored in a fingerprint data repository of the server 101. Once a particular as-measured value, a pattern or signature based on any one or more of received wireless communication signal strength and signal connectivity parameters, magnetic field parameters or barometric pressure parameters, and mobile device inertial sensor data is detected or recorded by the mobile device, the value or pattern as detected may be matched to a reference fingerprint stored in a fingerprint map of a given facility, for example as stored in positioning fingerprint repository, to identify the unique position of the mobile device relative to the facility, a process also referred to herein as localization.

Methodology

FIG. 3 illustrates, as an example, a method of criterion-based calibration for localization of mobile devices. In describing FIG. 3, reference to the description and examples of FIGS. 1-2 should be understood to be part thereof for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 3 examples of method steps described herein are techniques are performed by the processor 200 executing one or more sequences of software logic instructions that constitute the component estimator 105, the estimate evaluator 106, and the validator 222 of the server 101. In embodiments, component estimator 105, the estimate evaluator 106, and the validator 222 may include the one or more sequences of instructions within sub-modules. Such instructions may be read into the memory 205 from machine-readable medium, such as memory storage devices. Execution of the sequences of instructions contained in the component estimator 105, the estimate evaluator 106, and the validator 222 in the memory 205 causes the processor 200 to perform the process steps described herein. It is contemplated that, in some implementations, some of the sub-modules, or any other portions of executable instructions constituting the component estimator 105, the estimate evaluator 106, and validator 222 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

At block 310, sensorial data for a zone in the indoor space is obtained. The sensorial data can include, for instance, data from signal sensors and inertial sensors. The zone is associated with a set of factors, such as a size of the zone, a shape of the zone, a type of the zone, a number of users passing through the zone, and predicted movement patterns of the mobile device in the zone, which can influence a behavior of the sensorial data in the zone. As an example, for the purposes of calibration, the indoor space can be segregated into a plurality of zones or the entire indoor space can be considered one zone.

At block 320, based on the sensorial data of the zone, at least one component of instantaneous localization in the zone is estimated, for instance, using localization techniques. As part of such estimation, the variation of the at least one component in the zone, owing to the behavior of the sensorial data is simulated. The component of instantaneous localization can include, for example, a trajectory of the mobile device, a variation in speed along the trajectory, a variation in elevation along the trajectory, an allowable threshold variation in the at least one component, or any combination thereof.

In another implementation, for instance, for making the processing of the sensorial data manageable, the entire set of sensorial data can be broken down into smaller sets by classifying the sensorial data into localization parameter sets. A predetermined classification parameter can be used for breaking down the entire sensorial data. In said implementation, as part of estimation explained above, the component of instantaneous localization can be determined individually for each localization parameter set and the results integrated, as explained below.

At block 330, the estimation, i.e., the results of estimation of the component of instantaneous localization, can be evaluated based on a ground truth value of that component. In an example, the estimation can be evaluated by determining an error in estimation of the component of instantaneous localization with respect to the ground truth value of the component. As an example, the ground truth value of the component can be a known true value of the component previously determined for that zone using one or more techniques which have been established to be accurate. In the alternative implementation explained above, the estimate evaluator 106 can evaluate the estimation of the components, for each localization parameter set, based on the ground truth value of that component.

Once the evaluation is done, at block 340 a localization criterion can be associated with the zone and the localization criterion can be indicative of a selectivity in use of the sensorial data in that zone for localizing the mobile device 110. As explained above, in an example, the localization criteria can include a weightage to be associated with the type of sensorial data or the source thereof, which in turn can be based on the reliability score associated with the sensorial data. Therefore, in said example, as part of associating, the weightage can be assigned with the sensorial data from each of the various sensors, based on a reliability score linked with the sensorial data for each identified zone.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method of calibrating an indoor space for localizing a mobile device, the method comprising:
    obtaining, by a processor, sensorial data for a zone in the indoor space, the zone being associated with a set of factors influencing a behavior of the sensorial data in the zone, the set of factor comprising at least one of a size of the zone, a shape of the zone, a type of the zone, a number of users passing through the one, and predicted movement patterns of a mobile device in the zone;
    estimating, by the processor, at least one component of instantaneous localization in the zone based on the sensorial data, wherein the estimating comprises simulating variation of the at least one component owing to behavior of the sensorial data in the zone;
    evaluating, by the processor, the estimation of the at least one component based on a ground truth value of the at least one component;
    associating, by the processor, a localization criterion with the zone, wherein the localization criterion is indicative of a selectivity in use of the sensorial data for localizing the mobile device in the zone, the localization criterion being based on the evaluating; and
    providing, by the processor, indoor-location based services to mobile devices in the indoor space using the localization criterion, wherein the mobile devices are to perform localization based on the localization criterion.

2. The method of claim 1, wherein estimating comprises:
    classifying the sensorial data into a plurality of localization parameter sets, based on a predetermined classification parameter;
    estimating, individually, the at least one component in the zone based on each of the plurality of localization parameter sets;
    evaluating the estimation of the at least one component, for each of the plurality of localization parameter set, based on the ground truth value of the at least one component; and
    assigning a weightage with each of the plurality of localization parameters sets, based on the evaluation, the weightage being indicative of a reliability score associated with each of the plurality of localization parameters in estimating the at least one component.

3. The method of claim 2, wherein the predetermined classification parameter includes at least a source of the sensorial data, the source of the sensorial data being at least one of signal sensors and inertial sensors.

4. The method of claim 1, wherein the evaluating comprises determining an error in estimating the at least one component in the zone.

5. The method of claim 4, wherein the evaluating comprises selecting an evaluation technique based on at least a source of the sensorial data.

6. The method of claim 1, wherein the associating comprises assigning a weightage with each type of the sensorial data, based on a reliability score linked with each type of the sensorial data in estimating the at least one component.

7. The method of claim 1, wherein the at least one component comprises at least one of a trajectory of the mobile device, a variation in speed along the trajectory, a variation in elevation along the trajectory, and an allowable threshold variation in the at least one component.

8. The method of claim 1, further comprising performing a qualitative validation of the sensorial data based on a set of qualitative modifiers.

9. The method as claimed in claim 8, wherein the set of qualitative modifiers comprises at least one of a density of visits in the zone, a density of the sensorial data collected for the zone, a density of sources of sensorial data in the zone, a stability of the sources of the sensorial data in the zone, an average deviation in the sensorial data in the zone, a diversity in the sensorial data collected from the zone, a frequency of collection of sensorial data from the zone, and an average localization accuracy in the zone.

10. A server computing device comprising:
a processor; and
a memory storing a set of instructions, the instructions executable in the processor to:
obtain sensorial data for a zone in an indoor space, the zone being associated with a set of factors influencing a behavior of the sensorial data in the zone, the set of factor comprising at least one of a size of the zone, a shape of the zone, a type of the zone, a number of users passing through the zone, and predicted movement patterns of a mobile device in the zone;
estimate at least one component of instantaneous localization in the zone based on the sensorial data, wherein the estimating comprises simulating variation of the at least one component owing to behavior of the sensorial data in the zone;
evaluate the estimation of the at least one component based on a ground truth value of the at least one component;
associate a localization criterion with the zone, wherein the localization criterion is indicative of a selectivity in use of the sensorial data for localizing the mobile device in the zone, the localization criterion being based on the evaluating; and
provide indoor-location based services to mobile devices in the indoor space using the localization criterion, wherein the mobile devices are to perform localization based on the localization criterion.

11. The server computing device of claim 10 further comprising instructions to:
classify the sensorial data into a plurality of localization parameter sets, based on a predetermined classification parameter;
estimate, individually, the at least one component in the zone based on each of the plurality of localization parameter sets;
evaluate the estimation of the at least one component, for each of the plurality of localization parameter set, based on the ground truth value of the at least one component; and
assign a weightage with each of the plurality of localization parameters sets, based on the evaluation, the weightage being indicative of a reliability score associated with each of the plurality of localization parameters in estimating the at least one component.

12. The server computing device of claim 11, wherein the predetermined classification parameter is at least a source of the sensorial data, the source of the sensorial data being at least one of signal sensors and inertial sensors.

13. The server computing device of claim 10, further comprising instructions to determine an error in estimating the at least one component in the zone.

14. The server computing device of claim 13 further comprising instructions to select an evaluation technique to determine error based on at least a source of the sensorial data.

15. The server computing device of claim 10 further comprising instructions to assign a weightage with each type of the sensorial data, based on a reliability score linked with each type of the sensorial data in estimating the at least one component.

16. The server computing device of claim 10, wherein the at least one component comprises at least one of a trajectory of the mobile device, a variation in speed along the trajectory, a variation in elevation along the trajectory, and an allowable threshold variation in the at least one component.

17. The server computing device of claim 10 further comprising instructions to perform a qualitative validation of the sensorial data based on a set of qualitative modifiers.

18. The server computing device of claim 17, wherein the set of qualitative modifiers comprises at least one of a density of visits in the zone, a density of the sensorial data collected for the zone, a density of sources of sensorial data in the zone, a stability of the sources of the sensorial data in the zone, an average deviation in the sensorial data in the zone, a diversity in the sensorial data collected from the zone, a frequency of collection of sensorial data from the zone, and an average localization accuracy in the zone.

* * * * *